Reissued May 15, 1934 Re. 19,166

UNITED STATES PATENT OFFICE 19,166

FILTER AID

Harry S. Thatcher, Oxnard, Calif., assignor, by mesne assignments, to Celite Corporation, New York, N. Y., a corporation of New York No Drawing. Original No. 1,632,458, dated June 14, 1927, Serial No. 46,850, July 29, 1925. Application for reissue February 23, 1934, Serial No. 712,604

16 Claims. (Cl. 210—203)

This invention pertains to a filter aid or filtration medium produced in accordance with the herein disclosure regarding the physical properties of such aid.

An object of this invention is to disclose the physical characteristics of a filter aid which is capable of giving a high rate of flow or volume efficiency and at the same time gives good clarification or quality efficiency. A further object is to place limitations upon the particle sizes to be utilized in manufacture of such filter aids.

The act of filtration pertains to the removal of solids from liquids and may be called clarification. Clarification may be defined as a filtration involving the removal of a small quantity of suspended matter, such as is commonly termed turbidity and which may only amount to a few per cent of the weight of the liquid or possibly only a fraction of one per cent. In some cases the suspended matter may be very fine and the material removed may be of microscopic size. The art of filtration may also embrace those filtration processes in which certain solid suspended matters may be or may not be removed, but in which the fluid being filtered is also acted upon by the filtering material either chemically or physically or in both manners. For example, the filter aid may merely decolorize or adsorb coloring matter from the fluid, or, in the filtration of emulsions, the filter aid may upset the equilibrium present in the emulsion so that although both or all constituents pass through the filter aid, they settle, or separate gravitationally after such filtration.

My invention pertains, particularly, to the particle size of filter aids or materials used in filtration, as defined above. The particle size of materials for filtration has not received the attention of investigators, but I have found that this property has an important bearing upon the effectiveness of such materials. For example, it is well known in the art that filtration of water may be accomplished by means of sand, but this filtration is rather elementary and does not remove very finely divided particles in suspension because of the large porosities existing between the individual particles composing the filter bed. Large porosities increase the rate of flow through the filter bed but at the same time they allow the finer suspended impurities to go through. A filter aid composed of very finely ground material may give clarity in the resulting filtrate but generally this condition is accompanied by a reduction in the rate of flow. The investigations which result in my invention were directed to the production of a filter aid which would give a high rate of flow and at the same time clarity.

Furthermore, filtration is not merely the mechanical removal of solid suspended impurities by passing the liquid carrying such impurities through a filter bed, but very often is a chemico-physical problem, as in the case of decolorization and treatment of emulsions cited above. In the latter instances, and also in mechanical filtration, to a certain extent, the effectiveness of the filter aid is dependent upon the surface area of the material. This surface area of a finely divided solid material increases very rapidly with the reduction of particle size and may be judged from the following:

*Increase in surface area by subdividing a centimeter cube*

| Length of edge | Number of cubes | Total surface |
|---|---|---|
| | | *Sq. cm.* |
| 1 cm. | 1 | 6 |
| 1 mm. | 1,000 | 60 |
| 0.1 mm. | 1,000,000 | 600 |
| 0.01 mm. or 10 microns | 1,000,000,000 | 6,000 |
| 0.001 mm. or 1 micron | 1,000,000,000,000 | 60,000 |

This increased surface area affects the effectiveness of the filter aid as in many cases adsorption of impurities in the liquid being treated by means of such aid plays an important part. I again have reference to the decolorizing processes before mentioned, in which materials such as carbons, charcoals, fuller's earth and decolorizing clays are used. It is, therefore, seen that it is desirable to have a filter aid composed of very fine individual particles, and at the same time retain or enhance the rate of flow through the filter bed composed of such material. I have found that this may be obtained by preparing a filter aid having particles ranging in sizes from a relatively coarse particle to very fine, in such proportions that they do not form a mass of maximum density upon the filtering surfaces of the filtering apparatus. Whatever reasons or theories underlie my preferred grading of particle sizes in a filter aid is of no moment, however, and I do not wish to limit myself to any one theory, my invention relying upon the facts disclosed by my investigations, namely, that a filter aid containing a certain maximum per cent of large and a certain maximum per cent of small particles produces a desirable filter aid as hereinafter disclosed.

It is admitted that filter aids have been used heretofore in a finely divided condition but no work has ever been done to place limitations upon the fineness of the material used for this purpose. Indiscriminate grinding of a filter aid such as, for example, diatomaceous earth, does not produce a filter aid which is capable of giving a high rate of flow and clarity in the resulting filter aid. When such grinding or disintegration, however, is carried out in accordance with my invention so as to produce a material having particle sizes falling within the limitations hereinafter disclosed, the rate of flow obtained is higher than that obtained with other filter aids and the clarity is excellent, that is, even the very finest suspended or colloidal particles are retained by such filter aid.

I have found that when inorganic solid materials adapted for manufacture of filter aids, such as diatomaceous earth (otherwise known as kieselguhr, tripoli, fossil flour, infusorial earth, or molar whether calcined or uncalcined), are so disintegrated or crushed that not more than 10% of the disintegrated product is left on a 150 mesh screen, not more than 50% or less than 15% of the material, by weight, is composed of particles having an average dimension of about 10 microns (0.01 mm.) or larger and contain not more than 25% by weight of particles smaller than 1 micron (0.001 mm.) in mean dimension, or diameter, such filter aids will show a high rate of flow and at the same time give good clarification.

Because of the difficulty of determining the exact amount of finely divided material coarser than or smaller than any of the sizes hereinbefore mentioned, my invention should not be held strictly to the limitations disclosed. It is to be remembered that particles one micron in diameter are in the order of twelve thousand meshes to the linear inch. The determination of particle sizes may be made either by sedimentation in a suitable liquid or by means of microscopical examination or by any other suitable means, but I have found the first two methods preferable.

The above specification for the fineness of filter aids needs a certain amount of explanation. I have found that there are active and inactive constituents in filter aids, the inactive particles being composed of very fine isotropic particles generally having a diameter of about one micron, such particles filling the voids between larger particles and thereby reducing the rate of flow through a filter cake. A certain amount of these fine particles may be necessary, however, for the elimination or retention of very fine, suspended, or colloidal impurities present in the liquid being filtered. I have also found that it is well to remove very large particles which settle rapidly in the liquid being filtered and thereby become inactive as filter aids.

Most of the particles composing the filter aids are anisotropic and I have found that spicular particles are particularly useful as filter aids. It is readily conceived that a filter cake composed of anisotropic or spicular particles will contain a much higher percentage of voids than a filter cake composed of perfectly spherical or cubical particles. It will be also seen that by means of the above specifications I have placed limits as to the maximum and minimum percentage of particles that are relatively coarse and inactive and also a maximum limitation on the amount of very fine particles which are practically inactive, so that the largest proportion of the filter aid is composed of intermediate sizes, such sizes being most effective.

In determining the particle sizes, of a diatomaceous earth filter aid having a specific gravity of 2.1, I have followed the following procedure, which is representative of the method. Two grams of the diatomaceous earth used in one test was placed into suspension in 100 cc. of distilled water and shaken continuously for five minutes, the suspension was then placed in a sedimentation cell containing a sedimentation plate or watch crystal suspended in the cell from a balance arm of an analytical balance. The material settled from the suspension onto the plate and the weight of the settled material was observed at convenient intervals. At the expiration of say 24 hours the final reading was taken and the amount of material still remaining in suspension was determined by evaporating the liquid and calcining the residue.

The continual change in the buoyant effect on the plates was taken into account by making a graph, assuming that the weight of the plate itself varies uniformly according to the amount of the material in suspension at any given time. The percentage settled was plotted against the time and the time intervals required for the particles of the various sizes to settle was determined from Stokes' law. Tangents drawn to the curve at the point calculated intercept on the percentage settled axis, lengths or percentages equal to the weight of the various size particles corresponding to the size and time divisions selected.

In determining the time required for settling by means of Stokes' law it will be seen that particles of spherical shape are taken into consideration. Inasmuch as there are practically no spherial particles in most filter aids, the final results obtained represent percentages or amounts of particles having approximately the same mass but not the shape of the particles reported. For example, using a specific gravity of 2.1, particles of about 10 microns in diameter will settle at a rate of 0.36 centimeter per minute in distilled water at 20° C. in accordance with Stokes' law. All particles which settle at this rate from a diatomaceous earth filter aid under the same conditions are reported as particles having a diameter of about 10 microns, although in fact they may be, and very often are, anisotropic particles of from abopt 15 to 25 microns long, depending on their cross section. Furthermore, the relationship of mass to shape is not perfectly true inasmuch as an anisotropic particle of the same mass as a spherical particle will not necessarily settle at the same rate because of stream line and surface effects. Isotropic particles such as those of 1 micron and finer settle under the same conditions at the rate of 0.0036 centimeter per minute. Naturally, particles which settle at a rate slower than 0.0036 centimeter per minute are smaller than 1 micron. A method for determining the particle sizes is described in The Svedberg's "Colloid Chemistry", pages 136–146 (A. C. S. Monograph).

Inasmuch as various grades of diatomaceous earth vary in specific gravity from 1.9 to 2.3 the rates of settling given above are only a mean between the limits here given. For example, 10 micron particles of 1.9 gravity settle at a rate of about 0.30 cm. per minute, while 10 micron particles of 2.3 gravity settle at about 0.42 cm. per minute.

My invention may, therefore, be defined as follows: A filter aid composed of particles so that not more than 10% of material remains on a 150 mesh screen, not more than 50% or less than 15% of material by weight settles at an appreciably higher rate in distilled water at 20° C. than about 0.36 cm. per minute, and contains from none to at most 25% by weight of particles which settle in distilled water at 20° C. at a rate of about 0.0036 cm. per minute or slower. This interpretation includes anisotropic particles behaving as spherical particles of 10 microns and 1 micron diameter.

Complete particle size analysis of two diatomaceous earth products which have been used in filtration with excellent results were made in accordance with this invention and are as follows:

| No. 1 | | No. 2 | |
|---|---|---|---|
| Percent by weight of material | Particle size | Percent by weight of material | Particle size |
| *Percent* | *Microns* | *Percent* | *Microns* |
| 40 | 10 | 28 | 10 |
| 13 | 8–10 | 6 | 8–10 |
| 13 | 6–8 | 8 | 6–8 |
| 15 | 4–6 | 13 | 4–6 |
| 14 | 2–4 | 20 | 2–4 |
| 4 | 1–2 | 11 | 1–2 |
| 1 | 1 | 14 | 1 |

The above products, and others of intermediate particle size analysis, are preferred examples of this invention.

The desirability of manufacturing a filter aid having particles graded in accordance with my invention may be seen from the following data on actual filtration tests using a 60° Brix sugar solution and a small pressure filter press. All of the filter aids were made of diatomaceous earth and were added to the solution to be filtered at the rate of 0.3% filter aid on weight of sugar in the solution. The pressure was increased at the same rate in all tests and the temperature of liquid being filtered was kept at 80° C.

| Particle distribution | My no. 2 product | Q. | S. |
|---|---|---|---|
| Larger than 10 microns | 28% | 3% | 55% |
| Between 10–6 microns | 14% | 8% | 36% |
| Between 6–1 microns | 44% | 30% | 8% |
| Smaller than 1 micron | 14% | 59% | 1% |
| Rate of flow gallons per sq. ft. per hr. | 4.5 | 1.44 | 10.5 |
| Rate of flow, percentage | 100% | 32% | 232% |
| Clarity of filtrate | Brilliant. | Dirty. | Very dirty. |

The filter aid designated as Q was milled very fine and, therefore, contained more than 25% of 1 micron particles and gave both a low rate of flow and a dirty filtrate. The material designated as S having more than 50% of 10 microns or larger particles gave a very high rate of flow but did not retain any of the impurities present in the liquid being filtered and was, therefore, useless. These two materials do not fall within my particle size limitations and show by comparison the value of my invention.

The manufacture of diatomaceous earth filter aids, for example, in accordance with the above specifications may be most easily carried out by means of disintegrating machinery, such as swing hammer mills or impact disintegrators of suitable design, from which the disintegrated material is carried by pneumatic means to air separating machinery, such as cyclones or other conical separators. In such separators the coarser particles are removed and the gases discharging from such air separators are passed by means of fans, impellers, or other suitable blowers (which may also act as secondary disintegrators), to secondary cyclones or other air separators in which the very fine particles, or so-called dust, are removed. By regulating the disintegrating machinery, speed of fans and quantity of material being disintegrated, the particle size of the resulting product may be controlled within fairly well defined limits. In such disintegration, an air separation by the above described means is fairly well known in the mill industries. I lay no claims to the apparatus used in the production of my filter aid, and any suitable method of manufacture may be followed, provided the product has the particle size disclosed herein. Large scale water settling or washing processes, electrical precipitation processes, the use of electrolytes or coagulants or de-flocculating salts, etc. in the settling process of separation, may be employed in the manufacture of my product.

I claim:

1. A finely divided diatomaceous filter aid containing between 28% and 40% by weight of particles having settling characteristics of spherical particles of same material and of the same specific gravity 10 microns and larger in diameter, and less than 14% but more than 1% by weight of particles having settling characteristics of spherical particles of same material and of the same specific gravity 1 micron and smaller in diameter.

2. A finely divided diatomaceous filter aid containing between 28% and 40% by weight of particles having settling characteristics of spherical particles of same material and of the same specific gravity 10 microns and larger in diameter, between 42% and 66% by weight of particles having settling characteristics of spherical particles of same material and of the same specific gravity 6 microns and larger in diameter, and less than 25% but more than 1% by weight of particles having settling characteristics of spherical particles of same material and of the same specific gravity smaller than 2 microns in diameter.

3. A finely divided diatomaceous filter aid containing between 28% and 40% by weight of particles having settling characteristics of spherical particles of same material and of the same specific gravity 10 microns and larger in diameter, between 42% and 66% by weight of particles having settling characteristics of spherical particles of same material and of the same specific gravity 6 microns and larger in diameter, and less than 14% but more than 1% by weight of particles having the settling characteristics of spherical particles of same material and of the same specific gravity smaller than 1 micron in diameter.

4. A finely divided diamtomaceous filter aid containing between 28% and 50% by weight of particles having settling characteristics of spherical particles of same material and of the same specific gravity 10 microns and larger in diameter, and between 5% and 25% by weight of particles having settling characteristics of spherical particles of same material and of the same specific gravity 2 microns and smaller in diameter.

5. A finely divided diatomaceous filter aid containing between 28% and 50% by weight of particles having settling characteristics of spherical particles of same material and of the same specific gravity 10 microns and larger in diameter, and less than 25% but more than 1% by weight of particles having settling characteristics of spherical particles of same material and of the same specific gravity smaller than 2 microns in diameter, 6. A finely divided diatomaceous filter aid containing between 28% and 50% by weight of particles having settling characteristics of spherical particles of same material and of the same specific gravity 10 microns and larger in diameter, between 42% and 66% by weight of particles having settling characteristics of spherical particles of same material and of the same specific gravity 6 microns and larger in diameter, and less than 25% but more than 1% by weight of particles having settling characteristics of spherical particles of same material and of the same specific gravity smaller than 2 microns in diameter.

7. A finely divided diatomaceous filter aid containing between 28% and 50% by weight of particles having settling characteristics of spherical particles of same material and of the same specific gravity 10 microns and larger in diameter, between 42% and 66% by weight of particles having settling characteristics of spherical particles of same material and of the same specific gravity 6 microns and larger in diameter, and less than 14% but more than 1% by weight of particles having settling characteristics of spherical particles of same material and of the same specific gravity smaller than 1 micron in diameter.

8. A finely divided calcined diatomaceous filter aid containing between 28% and 40% by weight of particles having settling characteristics of spherical particles of same material and of the same specific gravity 10 microns and larger in diameter, and between 5% and 25% by weight of particles having settling characteristics of spherical particles of same material and of the same specific gravity 2 microns and smaller in diameter.

9. A finely divided diatomaceous filter aid containing between 15% and 50% by weight of particles having settling characteristics of spherical particles of same material and of the same specific gravity 10 microns and larger in diameter, between 42% and 66% by weight of particles having settling characteristics of spherical particles of same material and of the same specific gravity 6 microns and larger in diameter, and between 5% and 25% by weight of particles having settling characteristics of spherical particles of same material and of the same specific gravity 2 microns and smaller in diameter.

10. A finely divided calcined diatomaceous filter aid containing between 28% and 40% by weight of particles having settling characteristics of spherical particles of same material and of the same specific gravity 10 microns and larger in diameter, between 42% and 66% by weight of particles having settling characteristics of spherical particles of same material and of the same specific gravity 6 microns and larger, less than 25% but more than 1% by weight of particles having settling characteristics of spherical particles of same material and of the same specific gravity smaller than 2 microns in diameter, and less than 14% but more than 1% by weight of particles having the settling characteristics of spherical particles of same material and of the same specific gravity smaller than 1 micron in diameter.

11. A finely divided calcined diatomaceous filter aid containing between 28% and 50% by weight of particles having settling characteristics of spherical particles of same material and of the same specific gravity 10 microns and larger in diameter, and less than 14% but more than 1% by weight of particles having settling characteristics of spherical particles of same material and of the same specific gravity smaller than 1 micron in diameter.

12. A finely divided calcined diatomaceous filter aid containing between 15% and 50% by weight of particles having settling characteristics of spherical particles of same material and of the same specific gravity 10 microns and larger in diameter, between 42% and 66% by weight of particles having settling characteristics of spherical particles of same material and of the same specific gravity 6 microns and larger in diameter, and less than 14% but more than 1% by weight of particles having settling characteristics of spherical particles of same material and of the same specific gravity smaller than 1 micron in diameter.

13. A finely divided calcined diatomaceous filter aid composed principally of irregularly shaped, anisotropic particles containing between 28% and 40% by weight of particles having settling characteristics of spherical particles of same material and of the same specific gravity 10 microns and larger in diameter, and between 5% and 25% by weight of particles having settling characteristics of spherical particles of same material and of the same specific gravity 2 microns and smaller in diameter.

14. A finely divided diatomaceous filter aid composed principally of irregularly shaped, anisotropic particles containing between 28% and 40% by weight of particles having settling characteristics of spherical particles of same material and of the same specific gravity 10 microns and larger in diameter, between 42% and 66% by weight of particles having settling characteristics of spherical particles of same material and of the same specific gravity 6 microns and larger, less than 25% but more than 1% by weight of particles having settling characteristics of spherical particles of same material and of the same specific gravity smaller than 2 microns in diameter, and less than 14% but more than 1% by weight of particles having the settling characteristics of spherical particles of same material and of the same specific gravity smaller than 1 micron in diameter.

15. A finely divided diatomaceous filter aid composed principally of irregularly shaped, anisotropic particles containing between 28% and 50% by weight of particles having settling characteristics of spherical particles of same material and of the same specific gravity 10 microns and larger in diameter, and less than 14% but more than 1% by weight of particles having settling characteristics of spherical particles of same material and of the same specific gravity smaller than 1 micron in diameter.

16. A finely divided diatomaceous filter aid composed principally of irregularly shaped, anisotropic particles containing between 15% and 50% by weight of particles having settling characteristics of spherical particles of same material and of the same specific gravity 10 microns and larger in diameter, between 42% and 66% by weight of particles having settling characteristics of spherical particles of same material and of the same specific gravity 6 microns and larger in diameter, and less than 14% but more than 1% by weight of particles having settling characteristics of spherical particles of same material and of the same specific gravity smaller than 1 micron in diameter.

HARRY S. THATCHER.